(12) United States Patent
Lakkavalli et al.

(10) Patent No.: US 11,257,503 B1
(45) Date of Patent: Feb. 22, 2022

(54) SPEAKER RECOGNITION USING DOMAIN INDEPENDENT EMBEDDING

(71) Applicants: Vikram Ramesh Lakkavalli, Bangalore (IN); Sunderrajan Vivekkumar, Chennai (IN)

(72) Inventors: Vikram Ramesh Lakkavalli, Bangalore (IN); Sunderrajan Vivekkumar, Chennai (IN)

( * ) Notice: Subject to any disclaimer, the term of this patent is extended or adjusted under 35 U.S.C. 154(b) by 0 days.

(21) Appl. No.: 17/197,564

(22) Filed: Mar. 10, 2021

(51) Int. Cl.
    *G10L 17/18* (2013.01)
    *G10L 15/08* (2006.01)
    *G10L 15/07* (2013.01)
    *G10L 17/04* (2013.01)

(52) U.S. Cl.
    CPC .............. *G10L 17/18* (2013.01); *G10L 15/07* (2013.01); *G10L 15/083* (2013.01); *G10L 17/04* (2013.01)

(58) Field of Classification Search
    CPC ....... G10L 17/18; G10L 17/04; G10L 15/083; G10L 15/07
    USPC ................ 704/244, 246, 241, 243, 240, 255
    See application file for complete search history.

(56) References Cited

U.S. PATENT DOCUMENTS

| | | | | |
|---|---|---|---|---|
| 5,950,157 A * | 9/1999 | Heck | .................. | G10L 17/20 704/234 |
| 6,542,866 B1 * | 4/2003 | Jiang | .................. | G10L 15/02 704/240 |
| 8,559,648 B2 * | 10/2013 | Christoph | ............... | H04S 7/302 381/71.12 |
| 9,159,315 B1 * | 10/2015 | Mengibar | ............. | G10L 15/005 |
| 9,972,339 B1 * | 5/2018 | Sundaram | ............... | G10L 25/78 |
| 11,043,207 B2 * | 6/2021 | Sharma | .................... | G10L 15/20 |
| 2005/0010410 A1 * | 1/2005 | Takiguchi | ............... | G10L 15/20 704/243 |

(Continued)

OTHER PUBLICATIONS

An analysis of the influence of deep neural network (DNN) topology in bottleneck feature based language recognition (Year: 2017).*

(Continued)

*Primary Examiner* — Akwasi M Sarpong
(74) *Attorney, Agent, or Firm* — Walter J. Tencza, Jr.

(57) ABSTRACT

Receiving a raw speech signal from a human speaker; providing an acoustic representation of the raw speech signal if the raw speech signal is determined to be within one of a plurality of pre-defined acoustic domains; augmenting the raw speech signal with the acoustic representation to provide a plurality of augmented speech signals; determining a set of a plurality of Mel frequency cepstral coefficients for each of the plurality of augmented speech signals, wherein each set of the plurality of Mel frequency cepstral coefficients is transformed using domain-dependent transformations to obtain acoustic reference vector, such that there are a plurality of acoustic reference vectors, for each one of the plurality of augmented speech signals; stacking the plurality of acoustic reference vectors corresponding to each augmented speech signal to form a super acoustic reference vector; and processing the super acoustic reference vector through a neural network which has been previously trained on data from a plurality of human speakers to obtain domain-independent embeddings for speaker recognition.

15 Claims, 5 Drawing Sheets

(56) References Cited

U.S. PATENT DOCUMENTS

| | | | | |
|---|---|---|---|---|
| 2005/0182624 | A1* | 8/2005 | Wu | G10L 21/0208 704/233 |
| 2008/0071540 | A1* | 3/2008 | Nakano | G10L 15/20 704/251 |
| 2010/0317420 | A1* | 12/2010 | Hoffberg | G06Q 30/0282 463/1 |
| 2012/0310587 | A1* | 12/2012 | Tu | G01D 1/16 702/141 |
| 2013/0006634 | A1* | 1/2013 | Grokop | G10L 17/10 704/245 |
| 2014/0278412 | A1* | 9/2014 | Scheffer | G10L 25/03 704/240 |
| 2018/0174576 | A1* | 6/2018 | Soltau | G06N 3/084 |
| 2019/0139540 | A1* | 5/2019 | Kanda | G10L 15/14 |
| 2020/0082831 | A1* | 3/2020 | Lesso | G10L 17/12 |
| 2020/0134444 | A1* | 4/2020 | Chen | G06N 3/0454 |
| 2020/0349950 | A1* | 11/2020 | Yoshioka | G10L 15/083 |
| 2021/0082399 | A1* | 3/2021 | Kurata | G10L 15/26 |

OTHER PUBLICATIONS

Domain Mismatch Compensation for Speaker Recognition Using a Library of Whiteners; Elliot Singer, IEEE Signal Processing Letters, vol. 22, No. 11, Nov. 2015.

The Effects of Handset Variability on Speaker Recognition Performance: Experiments on the Switchboard Corpus, Douglas A. Reynolds, Lincoln Laboratory, MIT, 1996 IEEE.

Front-End Factor Analysis for Speaker Verification, Najim Dehak et al., IEEE Transactions on Audio, Speech and Language Processing, vol. 19, No. 4, May 2011.

Multi-source I-vectors Domain Adaptation using Maximum Mean Discrepancy Based Autoencoders, Journal of Latex Class Files, vol. 6, No. 1, Jan. 2007.

Multi-Level Deep Neural Network Adaptation for Speaker Verification Using MMD and Consistency Regularization; Weiwei Lin, Dept. of Electronic and Information Engineering.

Reducing Domain Mismatch by Maximum Mean Discrepancy Based Autoencoders; WeiWei Lin et al. Odyssey 2018 The Speaker and Language Recognition Workshop Jun. 26-29, 2018, Les Sabl.

Speaker Recognition: A Tutorial; Joseph P. Campbell, Jr., Senior Member, IEEE; Proceedings of the IEEE, vol. 85, No. 9, Sep. 1997.

Speaker Verification in Mismatched Conditions with Frustratingly Easy Domain Adaptation; Jahangir Alam et al.; Odyssey 2018 The Speaker and Language Recognition Workshop 26-29.

Supervised domain adaptation for text-independent speaker verification using limited data; Seyyed Saeed Sarfjoo et al., INTERSPEECH Oct. 25-29, 2020, 2020, Shanghai, China.

X-Vectors: Robust DNN Embeddings for Speaker Recognition; David Snyder; Center for Language and Speech Processing; The Johns Hopkins University, 2018 IEEE; pp. 5329-5333.

Few-Shot Learning with Metric-Agnostic Conditional Embeddings; Nathan Hilliard et al.; Feb. 12, 2018.

* cited by examiner

SPEAKER RECOGNITION USING DOMAIN INDEPENDENT EMBEDDING

FIELD OF THE INVENTION

This invention relates to speaker recognition technologies.

BACKGROUND OF THE INVENTION

Speaker recognition is the problem of recognizing the identity of the speaker of a given speech signal of some specific duration. This problem falls into two broad categories: text-dependent and text-independent, depending on whether the input speech signal is constrained to be from a specific text (e.g. a password text) or not constrained to be of any specific text, i.e., the speech signal can be of any text (content) in any language. In a different definition, speaker recognition comprises two different problems: speaker-identification and speaker verification.

The speaker-identification (SID) problem is a multi-class problem of having to determine the identity of the input speech signal as one of many (e.g. N) speakers who are enrolled into the system. Speaker-verification (SV) is essentially a binary classification problem of determining whether the input signal is spoken by a claimed identity (of a speaker) or not—in the process yielding a Yes/No decision (i.e., of deciding whether the input signal is from the claimed identity (termed target speaker) or from a person other than the claimed identity—termed an imposter).

The problem of speaker recognition with mismatch in training and test conditions is a challenge still. Speaker recognition suffers mainly from variability of speech as described in D. A. Reynolds, The effects of handset variability on speaker recognition performance: experiments on the Switchboard corpus," 1996 IEEE International Conference on Acoustics, Speech, and Signal Processing Conference Proceedings, Atlanta, Ga., USA, 1996, pp. 113-116 vol. 1, which may be categorized into, i) the session variability: the variability of speech characteristics of a person over a period of time, ii) the channel variability: the variability introduced by the channel over which the speech is captured/transmitted etc., may be due to the change in microphone characteristics, change in recording conditions, losses during transmission, background noise among others.

This problem of mismatch in training and testing conditions arises because of a practical requirement that a user cannot be constrained to speak in a unique acoustic condition all the time. This mismatch of acoustic space during training and test conditions gives rise to changes in representation of speakers in the feature space. This variability of representation of a speaker in feature space leads to poor performance of a speaker recognition system as described in Elliot Singer, Douglas A. Reynolds, Domain Mismatch Compensation for Speaker Recognition Using a Library of Whiteners, IEEE SIGNAL PROCESSING LETTERS, VOL. 22, NO. 11, Nov. 2015, pp. 2000 2003.

Variability in acoustic conditions makes a speaker recognition system more prone to classification errors. To measure the classification error in a speaker recognition system, two parameters are used, i) False acceptance, and ii) False rejection. False acceptance (FA) is the case when a user who is an imposter is accepted as the claimant speaker which is unacceptable. Similarly, false rejection (FR) is used to describe the rejection of the true claimant speaker as an imposter. In mismatched enrolment and test conditions, the probability that a true claimant speaker is rejected, and false acceptance rate is high. The rate of FA and the rate of FR are desired to be kept as minimal as possible for a practical system. Using these measures, the system performance is expressed in terms of equal error ratio (ERR), which is the percentage of error encountered by the system during speaker recognition, where, the rate of FA and the rate of FR are equal. System with a lower EER value is always preferred, although a zero value is desirable for EER, a small value in the range of 1% is acceptable as a good system.

The issue of training and test data being from different acoustic domains is currently addressed using two main known approaches. First, in domain adaptation, the speaker models are adapted for domain variability, second, and feature normalisation deals with the transformation of the speech features to obtain domain independent representations for better classification. With the advent of Deep Neural Network (DNN) architectures, importance is given to better feature extraction or feature normalisation as described in Seyyed Saeed Sarfjoo, Srikanth Madikeri, Peter Motlicek and Sabastien Marcel, Supervised Domain Adaptation for Text-Independent Speaker Verification Using Limited Data, 2020, Proc. Interspeech 2020, pp. 3815-3819; W. Lin, M. Mak, N. Li, D. Su and D. Yu, Multi-Level Deep Neural Network Adaptation for Speaker Verification Using MMD and Consistency Regularisation, ICASSP 2020-2020 IEEE International Conference on Acoustics, Speech and Signal Processing (ICASSP), Barcelona, Spain, 2020, pp. 6839-6843; and Lin, W., Mak, M., Li, L., Chien, J. (2018) Reducing Domain Mismatch by Maximum Mean Discrepancy Based Auto encoders. Proc. Odyssey 2018 The Speaker and Language Recognition Workshop, 162-167, DOI: 10.21437/Odyssey.2018-23; than domain adaptation which is mainly handled by probabilistic linear discriminant analysis (pLDA) as described in Najim Dehak, Patrick J Kenny, Reda Dehak, Pierre Dumouchel, Pierre Ouellet, Front-end factor analysis for speaker verification, IEEE Transactions on Audio, Speech, and Language Processing, vol. 19, no. 4, pp. 788-798, 2011 or other approaches used to model speaker. In domain adaptation, mainly the variance of the pLDA models are tweaked for generalization, as described in Jahangir Alam, Gautam Bhattacharya, Patrick Kenny, Speaker Verification in Mismatched Conditions with Frustratingly Easy Domain Adaptation, Odyssey 2018 The Speaker and Language Recognition Workshop 26-29 Jun. 2018, Les Sables d'Olonne, France, pgs. 176, and 180; of the variance which will help accommodate the variability in the acoustic domain. This approach of domain adaptation has helped to a certain extent, but this technique alone has not yielded the expected result.

Supervised Domain Adaptation for Text-Independent Speaker Verification Using Limited Data In one of the recent approaches as described in Seyyed Saeed Sarfjoo et al., the DNN model is trained with data from multiple channels. It was found that adapting the weights of the initial hidden layers yields better verification performance. Labelled training data is available for the purpose of training the DNN model for transforming the MFCC (Mel Frequency Cepstral Coefficient) feature data to an invariant representation.

Unsupervised Domain Adaptation via Domain Adversarial Training for Speaker Recognition. In Q. Wang, W. Rao, S. Sun, L. Xie, E. S. Chng and H. Li, Unsupervised Domain Adaptation via Domain Adversarial Training for Speaker Recognition, 2018 IEEE International Conference on Acoustics, Speech and Signal Processing (ICASSP), Calgary, A B, 2018, pp. 4889-4893; unsupervised adaptation is employed to train a DNN with three blocks. The first block of DNN provides feature transformation. The other two DNNs act on the features transformed output of the first DNN. The second DNN is trained to identify the domain and the weights of the first DNN are adapted through back propagation. This adaptation of weights is called domain adversarial training which helps remove the effects of variability in feature space. The training data need not contain the domain/acoustic information labels in this approach.

In U.S. published patent application no. 2020/0082831 A1, the invention is around normalising the scores of comparison of the model against test utterance for verification. The test utterance is passed through domain detection/classification/identification and also compared with a speakers' model for obtaining a score. This score is then modified based on the domain identified with changes to its mean and variance. The approach tries to compensate for the scores obtained through a separate domain identifier.

One approach employs auto-encoders to maximize the discrepancy between domains using a metric and generalizes it as described in W. Lin, M. Mak and J. Chien, "Multi source !-Vectors Domain Adaptation Using Maximum Mean Discrepancy Based Auto encoders," in IEEE/ACM Transactions on Audio, Speech, and Language Processing, vol. 26, no. 12, pp. 2412-2422, December 2018; for better separability of features and unique representation for each speaker. This approach proposes incorporating maximum mean discrepancy (MMD) in the loss function of auto-encoders to reduce mismatches. In that reference, a battery of auto-encoders are arranged in parallel for each domain, to obtain domain specific transformation of features. The auto-encoder is trained with a supervised set of training data containing data from multiple domains. Separate auto-encoders are trained for each domain and the feature obtained from each of the domain is considered to obtain MMD loss which is maximized to obtain better domain invariant feature representation.

The method proposed in N. Hilliard, L. Phillips, S. Howland, A. Yankov, C. D. Corley, and N. O. Hodas, "Few-shot learning with metric-agnostic conditional embeddings," arXiv preprint arXiv:1802.04376, 2018; uses a relation network approach for image classification. In this technique a few-shot learning paradigm is used to obtain results comparable to the state of the art outcomes for image classification. A few samples are used to compare the relation of the test image with that of the pre-defined set of images. Then, the comparison metric serves as a basis to categorize the image into its class.

SUMMARY OF THE INVENTION

One or more embodiments of the present invention provide a novel method, apparatus, process, and/or system to employ embedding for speaker recognition which is called DIEs (Domain Independent Embeddings). This feature set, of one or more embodiments of the present invention, is superior to the existing known prior art embeddings obtained from i-vector/x-vector or any known feature-transform. Domain diversity is made use of in this technique to its advantage than it being seen as an adversary for improved speaker recognition performance. In one or more embodiments of the present invention multiple domain specific feature extractors are configured such as i-vectors or x-vectors in computer memory by a computer processor. The feature vectors extracted from these transformations which are called acoustic reference vectors (ARVs) are then stacked to obtain a super-ARVs (SARVs), as programmed by computer software in computer memory and implemented by one or more computer processors. These SARVs represent a unique embedding are then passed through a neural network, implemented by one or more computer processors as programmed by computer memory, to obtain embedding with better classification ability. For the enrolment process, a domain classifier is used, by one or more computer processors, to help understand the domain identity of the speaker. The domain identity of the enrolment speech data is used for augmentation, by one or more computer processors, to obtain representative data for all the domains for enrolment. From each augmented copy of the input for enrolment, an SARV is obtained which is then transformed using a fully connected deep learning network to obtain domain invariant embedding (DIE), which is stored in computer memory, as programmed by one or more computer processors. The DIEs obtained from a training dataset with multiple speakers are then used, by one or more computer processors, to train a neural network or a simple probabilistic linear discriminant analysis (pLDA) model for speaker recognition.

In at least one embodiment, of the present invention, a technique is provided to address this variability in the representation of feature space by using multiple anchor points. The method employs the knowledge of multiple views of the speaker data from different standpoints represented by the transformation of speech representations. Here, for example, in at least one embodiment, MFCCs (Mel Frequency Cepstral Coefficients) is employed as the basic representation of speech, and i-vector as the transformation. This i-vector transformation is centered around an anchor point which is derived from the universal background model (UBM) as described in Najim Dehak et al. In the present invention, multiple transformations trained on independent acoustic domain representations help anchor data from multiple anchor points in acoustic space.

In practice, for a better speaker recognition performance, UBM is trained on a similar dataset of interest. Speech from the same person has different representation in feature space under different domains or acoustic conditions. Since this poses a challenge for speaker recognition, effort is put in isolating the contribution of variability in speech representation as described in Seyyed Saeed Sarfjoo et al.; and Q. Wang, W. Rao, S. Sun, L. Xie, E. S. Chng and H. Li, Unsupervised Domain Adaptation via Domain Adversarial Training for Speaker Recognition, 2018 IEEE International Conference on Acoustics, Speech and Signal Processing (ICASSP), Calgary, A B, 2018, pp. 4889-4893.

It is to be noted that the speaker recognition of one or more embodiments of the present invention is best analysed in the paradigm of few-shot learning where only one or few recordings of a speaker is available to obtain a model for the speaker. The model, of one or more embodiments of the present invention, typically needs to generalize and compensate for all the variations of the speaker during test for all other unseen acoustic conditions. In, in N. Hilliard, L. Phillips, S. Howland, A. Yankov, C. D. Corley, and N. O. Hodas, "Few-shot learning with metric-agnostic conditional embeddings," arXiv preprint arXiv:1802.04376, 2018; the invariance of the object in the image is achieved through a metric by comparing the relation between the features of the test image and a battery of pre-defined images representing different class labels. One or more embodiments of the present invention are an adaptation of this method disclosed in Hilliard et al., to speaker recognition, where, to achieve domain independence, the speaker enrolment data is first augmented, and then compared with multiple representative transformations rooted in different acoustic domains. In one or more embodiments of the present invention all the independent transformations of the feature vector are stacked and then passed through a neural network to obtain domain independence, but in the prior known Hilliard et al. technique noted above, the feature comprises of class similarity metric which is then processed using a neural network for classification of images;

In one or more embodiments of the present invention this variability in acoustic space is employed and made use of for a speaker by making use of multiple transformations or views.

In one or more embodiments, an apparatus is provided comprising: one or more computer processors; and one or more computer memories.

In at least one embodiment, the one or more computer processors implements a first computer software module stored in the one or more computer memories; wherein the first computer software module is programmed by computer software to receive a first human speech signal as an input, and output a number indicating a domain identity; wherein the one or more computer processors implements a second computer software module stored in the one or more computer memories; wherein the second computer software module is programmed by computer software to receive the first human speech signal as an input and output a plurality of augmented speech data with different noisy conditions; wherein the one or more computer processors implements a third computer software module stored in the one or more computer memories; wherein the third computer software module is programmed by computer software to receive the first human speech signal as an input and to output a plurality of Mel Frequency Cepstral Coefficient vectors; wherein the one or more computer processors implements a fourth computer software module stored in the one or more computer memories; wherein the fourth computer software module is programmed by computer software to perform a plurality of transformations, one on each of the plurality of Mel Frequency Cepstral coefficients to obtain a plurality of acoustic reference vectors; wherein one or more computer processors implements a fifth computer software module stored in the one or more computer memories; wherein the fifth computer software module is programmed by computer software to stack the plurality of acoustic reference vectors obtained for each of the augmented speech in one or more computer memories to form a super acoustic reference vector which includes a plurality of domain dependent transformations on the augmented human speech signal; wherein the one or more computer processors implements a sixth computer software module stored in the one or more computer memories; wherein the sixth computer software module is programmed by computer software to implement a neural network to transform the super acoustic reference vector into a plurality of domain independent embeddings by extracting common information between the plurality of domain dependent transformations; wherein the one or more computer processors implements a seventh computer software module stored in the one or more computer memories; wherein the seventh computer software module is programmed by computer software to perform a multi-class speaker-recognition task on the plurality of domain independent embeddings by using a neural network having an input and an output layer with a number of output nodes equal to a number of speakers enrolled in a system; wherein the multi-class speaker-recognition task processes the plurality of domain independent embeddings to provide a plurality of posterior probabilities, one for each speaker for a plurality of human speakers; wherein the one or more computer processors implements an eighth computer software module stored in the one or more computer memories; and wherein the eighth computer software module is programmed by computer software to provide an indication of speaker identification corresponding to a highest posterior probability.

In at least one embodiment, one or more computer processors implements an ninth computer software module stored in the one or more computer memories; and wherein the ninth computer software module is programmed by computer software provide an indication of speaker verification only if the highest posterior probability exceeds a threshold for a particular human speaker.

In at least one embodiment, a method is provided which includes receiving a raw speech signal from a human speaker; processing the raw speech signal using a computer processor in accordance with computer software stored in computer memory to provide an acoustic representation of the raw speech signal if the raw speech signal is determined to be within one of a plurality of pre-defined acoustic domains; augmenting the raw speech signal with the acoustic representation using a computer processor in accordance with computer software stored in computer memory to provide a plurality of augmented speech signals each of which is a copy of the raw speech signal with the addition of noise in time-domain; determining a set of a plurality of Mel frequency cepstral coefficients for each of the plurality of augmented speech signals using a computer processor in accordance with computer software stored in computer memory, wherein each set of the plurality of Mel frequency cepstral coefficients is transformed to acoustic reference vector using domain dependent transformation which can be an i-vector or x-vector like transformation, where each of the transformations are pre-trained on domain-specific data, such that there are a plurality of acoustic reference vectors, for each of the plurality of augmented speech signals; stacking the plurality of acoustic reference vectors in a computer memory using a computer processor in accordance with computer software stored in computer memory to form a super acoustic reference vector; and processing the super acoustic reference vector through a neural network which has been previously trained on data from a plurality of human speakers, wherein the neural network is stored on computer memory and is implemented by a computer processor in accordance with computer software stored in computer memory and wherein the neural network processes the super acoustic reference vector to provide a domain independent representation of the raw speech signal.

In at least one embodiment, the neural network is a dimensionally reducing fully connected neural network.

In at least one embodiment, the neural network is comprised of a plurality of hidden layers; wherein each of the plurality of hidden layers has a plurality of nodes; wherein each of the plurality of nodes of each of the plurality of hidden layers is connected to a corresponding node in a successive layer of the plurality of hidden layers, output layer is the last layer in the plurality of hidden layers; wherein the output hidden layer is configured to have a number of a plurality of output nodes which is less than a dimension of the super acoustic reference vector; wherein the neural network is pre-trained on multiple speaker data, through multiple non-linear transformations in each of the plurality of hidden layers; wherein the neural network transforms the super acoustic reference vector to a domain independent embedding which is a reduced dimensional output; and wherein the domain independent embedding includes common information between the acoustic reference vectors in the super acoustic reference vector.

The neural network may be a convolutional neural network comprised filters of varied dimensions which act on the super acoustic reference vector.

DETAILED DESCRIPTION OF THE DRAWINGS

Figure 1:
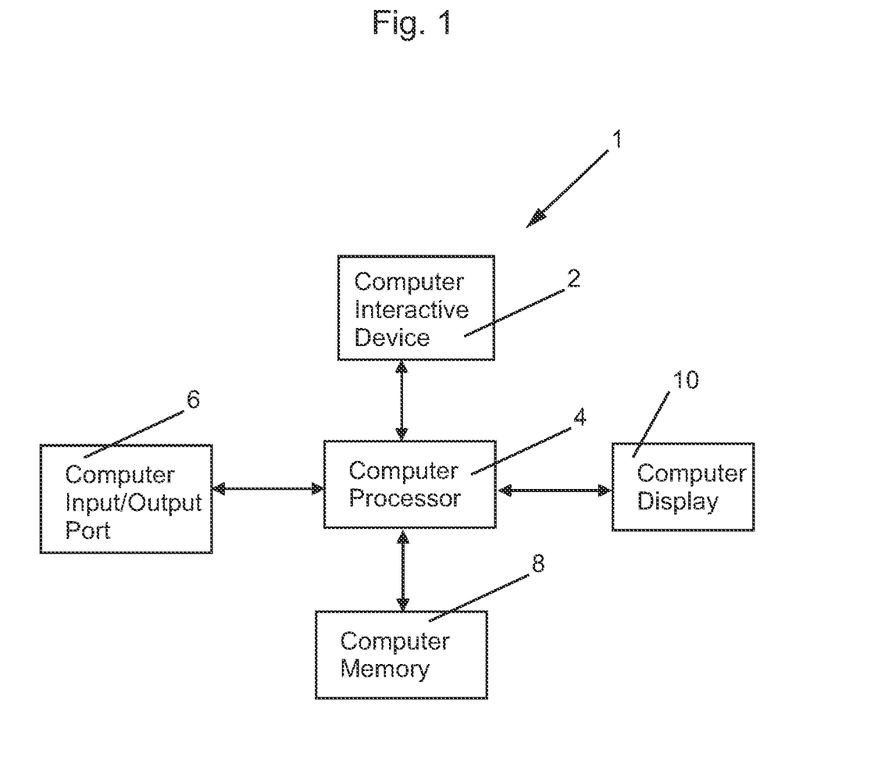
FIG. 1 is a simplified block diagram of an apparatus for use in accordance with an embodiment of the present invention, which includes a computer processor, a computer memory, a computer interactive device, and a computer input/output port.

FIG. 1 is a simplified block diagram of an apparatus 1 for use in accordance with an embodiment of the present invention, which includes a computer processor 4, a computer memory 8, a computer interactive device 2, and a computer input/output port 6. The computer input/output port 6 may include an audio sound transducer or sensor for converting sound into an electrical signal for input to the computer processor 4 and/or for storage in the computer memory 8. The computer processor 4 may be comprised of one or more computer processors. The computer memory 8 may be comprised of one or more computer memories.

Figure 2:
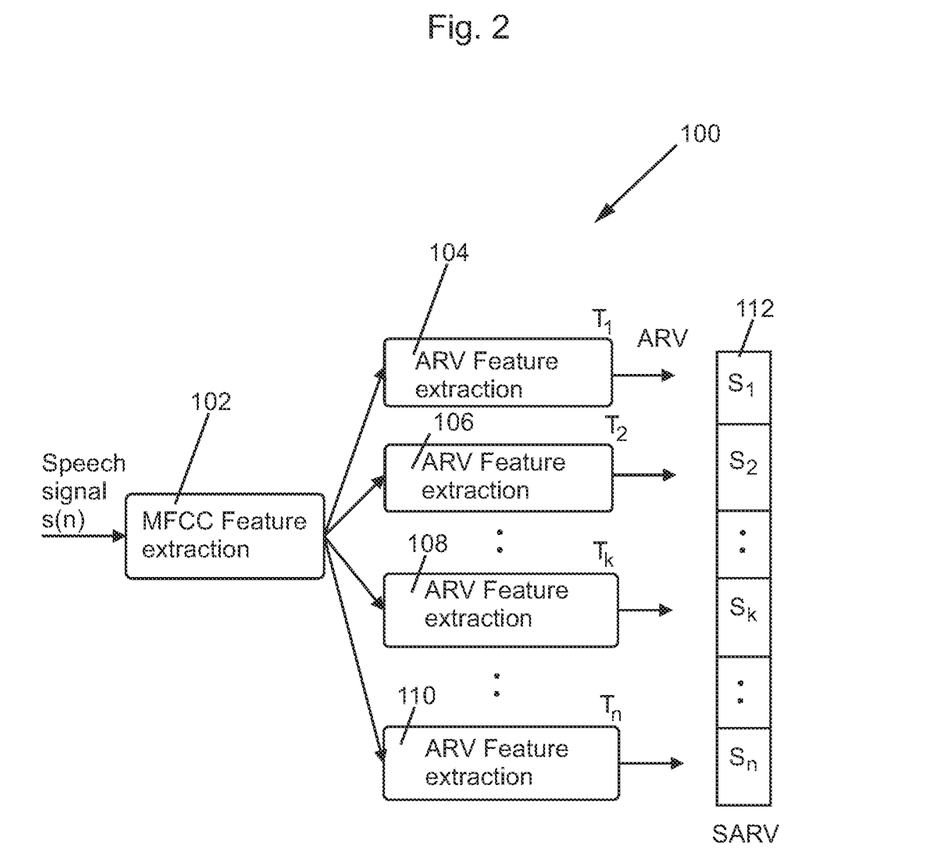
FIG. 2 is a simplified block diagram of a method of processing a speech signal which is implemented by the apparatus of FIG. 1 in accordance with at least one embodiment of the present invention.

FIG. 2 is a simplified block diagram 100 of a method of processing a speech signal which is implemented by the apparatus 1 of FIG. 1 in accordance with at least one embodiment of the present invention. The method may include receiving a speech signal s(n), such as at the input/output port 6, into the computer processor 4. The computer processor 4 may implement an MFCC (Mel Frequency Cepstral Coefficients) feature extraction process at step 102 on the speech signal s(n), as programmed by computer software stored in the computer memory 8. The Mel Frequency Cepstral Coefficients extracted at step 102 may be stored in the computer memory 8.

Figure 3:
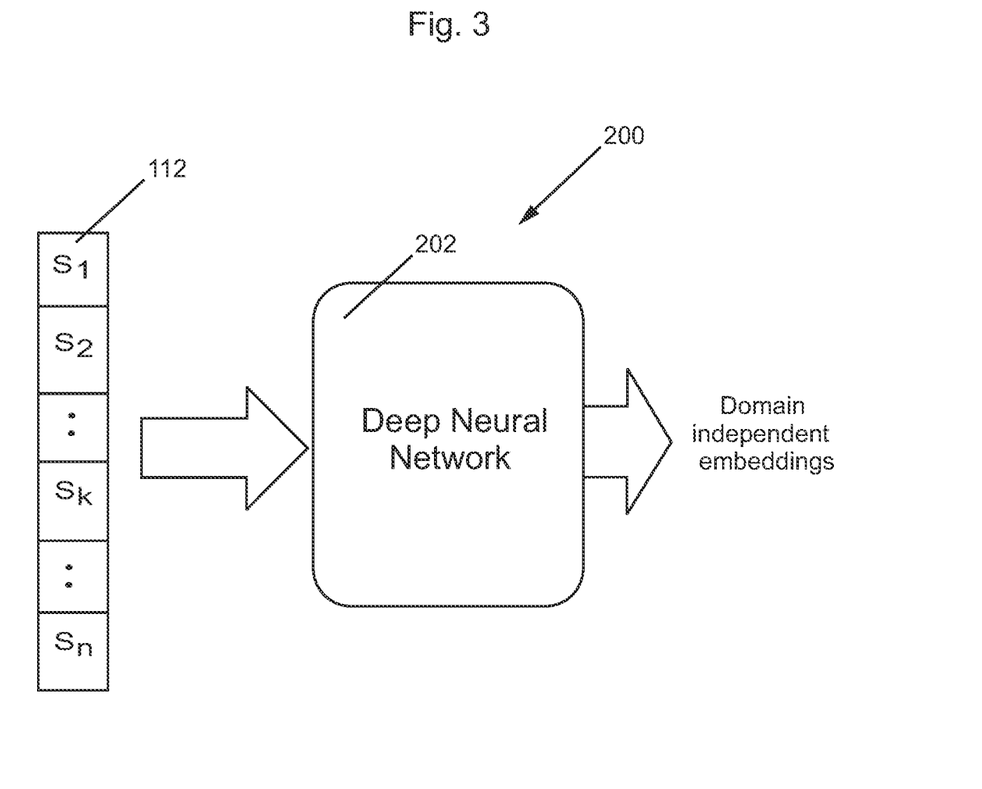
FIG. 3 is a simplified block diagram of a method of processing a column of signals through a deep neural network which may be implemented by the apparatus of FIG. 1, in accordance with at least one embodiment of the present invention.

The computer processor 4 may further implement, ARV (acoustic reference vector) feature extraction processes at steps 104, 106, 108, and 110 to provide the ARVs, $S_1$, $S_2$, $S_k$, and $S_n$ which are vectors of dimension D. The ARVs are the transformed representation of the MFCC feature representation from different transformation modules $T_1$, $T_2$, ... $T_k$, ... $T_n$ FIG. 3 is a simplified block diagram 200 of a method of processing the column 112 of signals through a deep neural network 202 which may be implemented by the apparatus 1 of FIG. 1, in accordance with at least one embodiment of the present invention. The deep neural network 202 may be located on computer processor 4, which may include one or more computer processors or sub computer processors, to generate domain independent embeddings at an output of the deep neural network 202.

Figure 4:
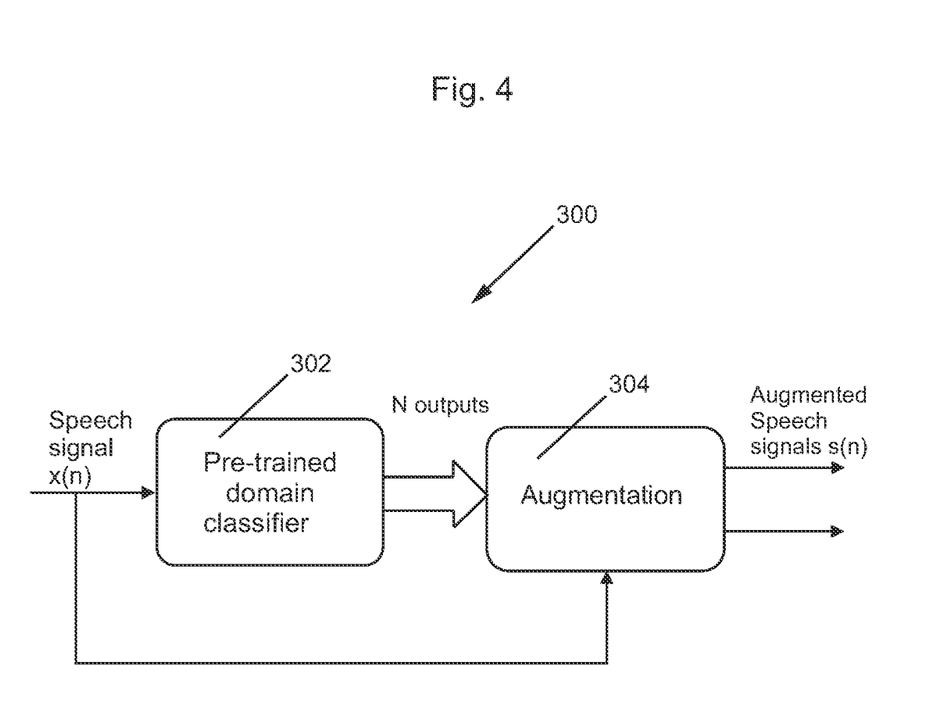
FIG. 4 is a simplified block diagram of a method of processing a speech signal which is implemented by the apparatus of FIG. 1 in accordance with at least one embodiment of the present invention.

FIG. 4 is a simplified block diagram 300 of a method of processing a speech signal x(n) which is implemented by the apparatus 1 of FIG. 1 in accordance with at least one embodiment of the present invention. The speech signal x(n) may be received the input/output port 6, and into the computer processor 4, and may be stored in computer memory 8, and a pre-trained domain classifier process 302 may be implemented by the computer processor 4 as programmed by computer software stored in computer memory 8. N outputs may be generated from the process 302, and input to an augmentation process 304, which may be implemented by the computer processor 4 as programmed by computer software stored in computer memory 8. Augmented speech signals may be output from augmentation process 304 at the outputs of process 304. The augmented speech signals s(n) may also be stored in computer memory 8.

A method, in one or more embodiments, of the present invention is somewhat similar to the known process disclosed in W. Lin, M. Mak and J. Chien; to the point that a method of one or more embodiments of the present invention uses features from multiple domains for obtaining invariant features. However, unlike the process disclosed in W. Lin, M. Mak and J. Chien, in one or more embodiments of the present invention, the domain independent vectors are obtained by having one or more computer processors, such as computer processor 4, consider vectors of the same data through various transformations. One or more embodiments of the present state-of-the-art invention considers the discriminability of the transformation between features, but in the process of one or more embodiments of the present invention, diversity of the feature vectors are considered to compensate for the domain variability.

To address domain variance in a speaker recognition system, the recent known prior approaches adapt feature normalization technique to obtain domain independent representation of speaker data. A method in accordance with one or more embodiments of the present invention, handles variability in domain by taking advantage of the domain variability instead of discounting it. In one or more embodiments of the present invention.

In one or more embodiments of the present invention, feature vectors are viewed from different perspectives by one or more computer processors, such as computer processor 4, or from different standpoints of independent anchor points from each domain. Each domain here corresponds to the acoustic space corresponding to unique acoustic/noise conditions such as speech from small room, big room, street noise etc. In FIG. 2, $T_1$, $T_2$, ..., $T_n$ are the transformers (trained on domain specific data) which transform input representation such as MFCC (Mel Frequency Cepstral Coefficients) as mentioned in the FIG. 2 to representative features such as i-vectors, as described in Najim Dehak et al., or x-vectors as described in Snyder, D., Garcia-Romero, D., Sell, G., Povey, D. Khudanpur, S. X-vectors: Robust DNN embeddings for speaker recognition". In 2018 IEEE International Conference on Acoustics, Speech and Signal Processing (ICASSP) (pp. 5329-5333). IEEE.

FIG. 2 shows system block diagram 100 to extract ARV (acoustic reference vector) and SARV (super-acoustic reference vector) features. $T_1$, $T_2$ ... $T_n$ represents the transformations to obtain ARVs from domain specific transformations. S={$S_1$, $S_2$, ... $S_n$} represents the SARV (super-acoustic reference vector).

FIG. 3 shows domain independent embeddings (DIE) from SARVs. The features obtained from domain specific transformations are then stacked together to obtain SARVs or super-acoustic reference vectors. For each enrolment, the input speech is classified as one of the multiple domains being considered for transformation based on a separate classifier which is trained to classify speech into one of many domains. Input speech signal is classified as belonging to one of N domains using a pre-trained domain classifier process 302, as implemented by one or more computer processors, such as computer processor 4 (shown in FIG. 1) as shown in FIG. 4. The pre-trained domain classifier process 302, classifies the speech signal x(n) into one of N classes. Based on the outcome of the classification, the speech signal is then augmented with domain specific augmentation by process 304, implemented by one or more computer processors, such as computer processor 4, in accordance with computer programming stored in the computer memory 8. For example, if the original signal x(n) belongs to a class referring to vehicular noise or quiet small room, then the signal is then augmented by process 304 with the conditions other than its original domain identity to which it belongs to. One or more embodiments of the present invention also use different room impulse responses (RIRs) and noises to effect this augmentation.

For each augmented speech signal s(n), a single SARV or column vectors 112, are extracted as shown in FIG. 2. The set of SARVs obtained from all the augmented speech signals are used to train a deep neural network 202 in one or more computer memories, such as computer memory 8. To train the deep neural network 202, an input speech signal x(n), shown in FIG. 4, is augmented at process step 304 based on its domain identity; modeled to reduce the dimensionality of the data. The Dimensionality Reducing Fully Connected Neural Network (DRFCNN), such as neural network 202 is trained with a large multi speaker dataset with SARVs obtained for each speaker. To train the DRFCNN or neural network 202 in FIG. 3, a supervised set of data is required. To the output of DRFCNN or neural network 202 is connected a classifier which has same number of output classes as the number of speakers used for training. After training, the output of DRFCNN or neural network 202 provides the domain invariant embeddings (DIE). To design a speaker recognition system, the DIEs are used to build a classifier using the Deep Neural Network (DNN) 202. The number of nodes contains the number of speakers enrolled in the system. A threshold for verification is set based on the scores/probability for imposters and same speakers.

In one or more embodiments of the present invention, instead of putting focus on removing or isolating the effects of variability in the domain or acoustic conditions of speech, one or more embodiment of the present invention use this variability to an advantage. In one or more embodiments of the present invention, in place of a single transformation model, multiple transformation of speech features are created. This forms multiple perspectives of speech features from independent domains or different views of the speech representation. These multiple "views" of the data from different perspectives help to anchor the data with multiple reference points in acoustic space. During the enrolment of a speaker, since, only domain specific and small amount of data is available, the input is carefully augmented to represent speaker representation in varied acoustic conditions. Each augmented speech input to the system then generates multiple views (or acoustic reference vectors) of the data and these views then form a representation of a speaker. Here, multiple domain dependent representation helps to obtain invariant representations for a speaker. This domain dependent representations (ARVs) (acoustic reference vectors) are then used to create SARV (super-acoustic reference vector). A neural network is taught to transform the SARVs into a transformed invariant feature representation called DIEs (domain invariant embeddings) amenable for easy classification of speakers.

In one or more embodiments of the present invention, a new technique is provided to address the domain variability in speech for speaker recognition. The new feature vectors, DIEs outperform the prior known techniques as they use of the variability of features to greater advantage than trying to discount them in analysis through different feature transformation techniques. The uniqueness of one or more embodiments of the present invention provides a simple and effective way to address variability of speech in different domain constraints.

Figure 5:
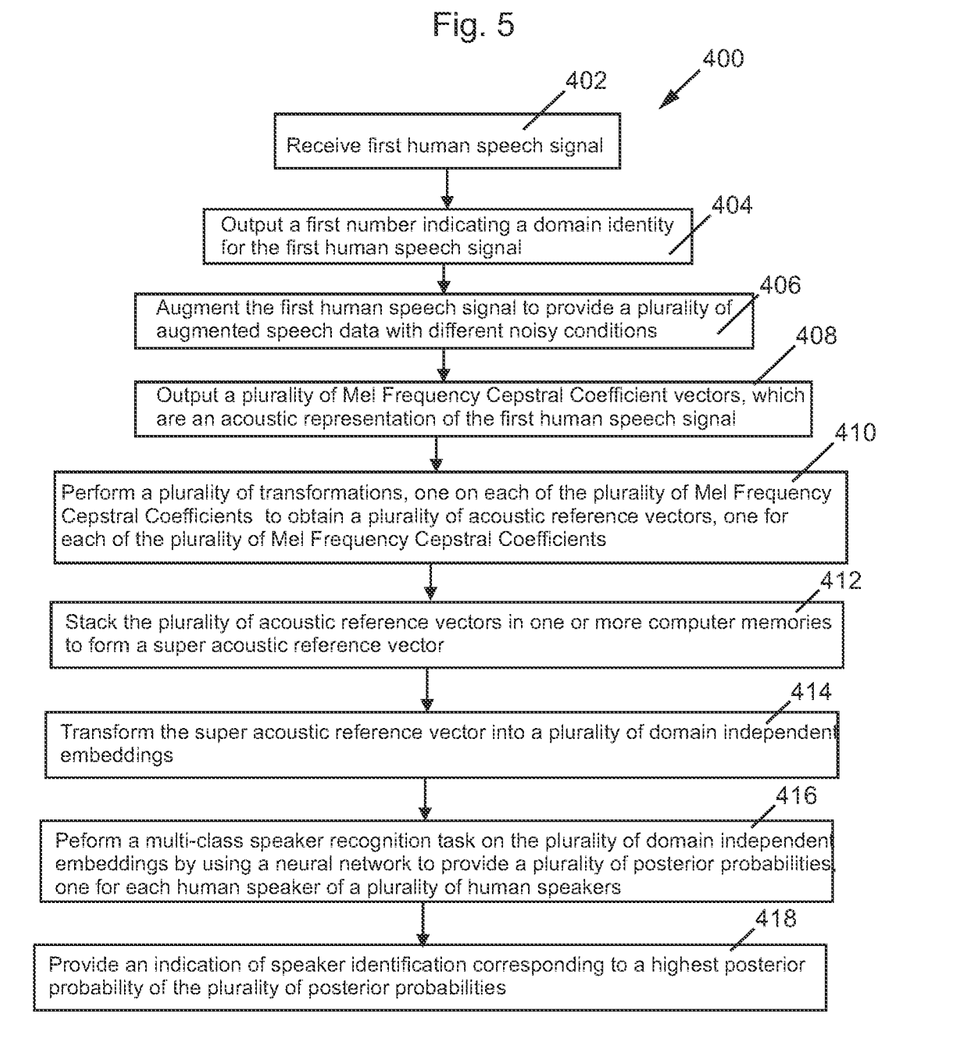
FIG. 5 shows a flow chart of a method in accordance with at least one embodiment of the present invention.

FIG. 5 shows a flow chart 400 of a method in accordance with at least one embodiment of the present invention.

At step 402, a first human speech signal is received, such as through computer input/output port 6 by the computer processor 4, and stored in the computer memory 8.

At step 404, the computer processor 4, as programmed by computer software stored in the computer memory 8, determines and outputs to the computer memory 8, and/or to the computer display or monitor 10, a first number indicating a domain identity for the first human speech signal.

At step 406, the computer processor 4, augments the first human speech signal to provide a plurality of augmented speech data or signals, each with a different noise condition, and the plurality of augmented speech data and/or signals are stored in computer memory 8 as programmed by computer software stored in computer memory 8.

At step 408, a plurality of Mel Frequency Cepstral Coefficient vectors may be determined and outputted, by the computer processor 4 to the computer memory 8 and/or to the computer display or monitor 10. The plurality of Mel Frequency Cepstral Coefficient vectors are an acoustic representation of the first human speech signal.

At step 410, the computer processor 4 may be programmed by computer software stored in the computer memory 8 to perform a plurality of transformations for each of the plurality of Mel Frequency Cepstral Coefficients to obtain a plurality of acoustic reference vectors;

At step 412, the computer processor 4 may stack the plurality of acoustic reference vectors to form a super acoustic reference vector in the computer memory 8, which may include one or more computer memories, as programmed by computer software stored in the computer memory 8.

At step 414, the computer processor 4 may transform the super acoustic reference vector in a plurality of domain independent embeddings, and may store these in computer memory 8, as programmed by computer software stored in computer memory 8.

At step 416 the computer processor 4 may perform a multi-class speaker recognition task on the plurality of domain independent embeddings by using a neural network to provide a plurality of posterior probabilities, one for each human speaker of a plurality of human speakers; and the plurality of posterior probabilities may be stored in computer memory 9.

At step 418, the computer processor 4 may provide an indication of speaker identification corresponding to a highest posterior probability of the plurality of posterior probabilities, and this indication may be stored in computer memory 8 and/or displayed on computer display 10.

A plurality of computer software modules may be stored in the computer memory 8. Each of the plurality of computer software modules may execute one or more steps, processes, or methods as disclosed in the present application, such as the steps, processes or methods shown in FIG. 5. The computer memory 8 may actually include a plurality of computer memories, and the each of the plurality of computer software modules may be stored in one or more computer memories.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

We claim:

1. An apparatus comprising:

one or more computer processors;

and one or more computer memories;

wherein the one or more computer processors implements a first computer software module stored in the one or more computer memories;

wherein the first computer software module is programmed by computer software to receive a plurality of human speech signals for a plurality of corresponding different human beings during training for the plurality of different human beings as inputs, and output a plurality of corresponding numbers indicating a plurality of corresponding domain identities of the corresponding plurality of human speech signals, such that each domain identity of each of the plurality of human speech signals indicates a particular type of noisy condition;

wherein the one or more computer processors implements a second computer software module stored in the one or more computer memories;

wherein the second computer software module is programmed by computer software to receive the plurality of human speech signals during training for the plurality of different human beings as inputs and output a corresponding plurality of sets of a plurality of augmented speech signals based on the plurality of corresponding domain identities, one corresponding set of the plurality of augmented speech signals for each of the plurality of different human beings, wherein each augmented speech signal of each corresponding set is a copy of the corresponding human speech signal of the plurality of human speech signals with the addition of a different noise condition in the time domain, such that each augmented speech signal in each set of the plurality of augmented speech signals differs from every other augmented speech signal in the same set for a particular human speech signal, and there are a plurality of different noise conditions in the same set of the plurality of augmented speech signals, wherein the different noise conditions in the same set of the plurality of augmented speech signals, are different from the type of noise condition indicated by the domain identity of the corresponding human speech signal;

wherein each plurality of different noise conditions in the same set of the plurality of augmented speech signals is not derived from the corresponding human speech signal of the plurality of human speech signals;

wherein the one or more computer processors implements a third computer software module stored in the one or more computer memories;

wherein the third computer software module is programmed by computer software to receive the plurality of sets of the plurality of augmented speech signals during training for the plurality of different human beings as inputs and to output a plurality of sets of a plurality of Mel Frequency Cepstral Coefficient vectors, wherein each set of the plurality Mel Frequency Cepstral Coefficient vectors is an acoustic representation of the corresponding set of the plurality of augmented speech signals;

wherein the one or more computer processors implements a fourth computer software module stored in the one or more computer memories;

wherein the fourth computer software module is programmed by computer software to perform a plurality of sets of a plurality of transformations during training for the plurality of different human beings, one transformation on each Mel Frequency Cepstral Coefficient vector of each set of the plurality of sets of the plurality of Mel Frequency Cepstral Coefficient vectors to obtain a plurality of sets of a plurality of acoustic reference vectors, one set of the plurality of acoustic reference vectors for each corresponding set of the plurality of Mel Frequency Cepstral Coefficient vectors;

wherein the one or more computer processors implements a fifth computer software module stored in the one or more computer memories;

wherein the fifth computer software module is programmed by computer software to stack each set of the plurality of acoustic reference vectors during training for the plurality of different human beings in the one or more computer memories to form a corresponding super acoustic reference vector, such that there are a plurality of super acoustic reference vectors, one for each of the plurality of different human beings, each of which includes a corresponding set of a plurality of domain dependent transformations of the corresponding set of the plurality of augmented human speech signals;

wherein the one or more computer processors implements a sixth computer software module stored in the one or more computer memories;

wherein the sixth computer software module is programmed by computer software to implement a neural network to transform the plurality of super acoustic reference vectors during training for the plurality of different human beings into a plurality of corresponding sets of domain independent embeddings by extracting common information between the corresponding set of the plurality of domain dependent transformations;

wherein the one or more computer processors implements a seventh computer software module stored in the one or more computer memories;

wherein the seventh computer software module is programmed by computer software to perform a multi-class speaker-recognition task during training of the plurality of different human beings on the plurality of corresponding sets of the plurality of domain independent embeddings by using a neural network having an input and an output layer with a number of output nodes equal to a number of speakers enrolled in a system;

wherein the multi-class speaker-recognition task processes the plurality of sets of domain independent embeddings during testing of a single human being, to provide a plurality of posterior probabilities, one for each speaker for a plurality of different human beings provided by training of the plurality of different human beings;

wherein the one or more computer processors implements an eighth computer software module stored in the one or more computer memories; and wherein the eighth computer software module is programmed by computer software to provide an indication during testing of the single human being of speaker identification corresponding to a highest posterior probability among the plurality of different human beings provided by training of the plurality of different human beings.

2. The apparatus of claim 1 further comprising wherein the one or more computer processors implements an ninth computer software module stored in the one or more computer memories; and wherein the ninth computer software module is programmed by computer software provide an indication of speaker identification only if the highest posterior probability exceeds a threshold for a particular human speaker.

3. A method comprising:

receiving a raw speech signal from a human speaker;

processing the raw speech signal using a computer processor in accordance with computer software stored in computer memory to provide an acoustic representation of the raw speech signal if the raw speech signal is determined to be within one of a plurality of predefined acoustic domains;

augmenting the raw speech signal with the acoustic representation using a computer processor in accordance with computer software stored in computer memory to provide a plurality of augmented speech signals each of which is a copy of the raw speech signal with the addition of noise in time-domain, wherein the raw speech signal is within a particular acoustic domain, and the noise added to form the augmented speech signals is in one or more acoustic domains which differ from the particular acoustic domain and is not derived from the raw speech signal;

determining a set of a plurality of Mel frequency cepstral coefficients for each of the plurality of augmented speech signals using a computer processor in accordance with computer software stored in computer memory, wherein each set of the plurality of Mel frequency cepstral coefficients is transformed using domain dependent transformations to a plurality of acoustic reference vectors, such that there is a plurality acoustic reference vectors for each of the plurality of augmented speech signals each corresponding to the domain-dependent transformations;

stacking the plurality of acoustic reference vectors computed for each of the plurality of augmented speech signals in a computer memory using a computer processor in accordance with computer software stored in computer memory to form a super acoustic reference vector corresponding to each of the plurality of augmented speech signals; and processing the super acoustic reference vector through a neural network which has been previously trained on data from a plurality of human speakers, wherein the neural network is stored on computer memory and is implemented by a computer processor in accordance with computer software stored in computer memory and wherein the neural network processes the super acoustic reference vector to provide a domain independent representation of the raw speech signal.

4. The method of claim 3 wherein the neural network is a dimensionally reducing fully connected neural network.

5. The method of claim 4 wherein the neural network is comprised of a plurality of hidden layers;

wherein each of the plurality of hidden layers has a plurality of nodes;

wherein each of the plurality of nodes of each of the plurality of hidden layers is connected to a corresponding node in a successive layer of the plurality of hidden layers, output layer is the last layer in the plurality of hidden layers;

wherein the output hidden layer is configured to have a number of a plurality of output nodes which is less than a dimension of the super acoustic reference vector;

wherein the neural network is pre-trained on multiple speaker data, through multiple non-linear transformations in each of the plurality of hidden layers;

wherein the neural network transforms the super acoustic reference vector to a domain independent embedding which is a reduced dimensional output; and wherein the domain independent embedding includes common information between the acoustic reference vectors in the super acoustic reference vector.

6. The method of claim 3 wherein the neural network is a convolutional neural network comprised filters of varied dimensions which act on the super acoustic reference vector.

7. An apparatus comprising:

one or more computer processors;

and one or more computer memories;

wherein the one or more computer processors implements a first computer software module stored in the one or more computer memories;

wherein the first computer software module is programmed by computer software to receive a first human speech signal as an input, and output a number indicating a domain identity;

wherein the one or more computer processors implements a second computer software module stored in the one or more computer memories;

wherein the second computer software module is programmed by computer software to receive the first human speech signal as an input and output a plurality of augmented speech signals with different noisy conditions, wherein the different noisy conditions are not derived from the first human speech signal;

wherein the one or more computer processors implements a third computer software module stored in the one or more computer memories;

wherein the third computer software module is programmed by computer software to receive the plurality of augmented speech signals and to determine a set of a plurality of Mel Frequency Cepstral Coefficients for each of the plurality of augmented speech signals;

wherein the one or more computer processors implements a fourth computer software module stored in the one or more computer memories;

wherein the fourth computer software module is programmed by computer software to perform a plurality of transformations, one on each set of the plurality of Mel Frequency Cepstral coefficients to obtain a plurality of acoustic reference vectors, one for each set of the plurality of Mel Frequency Cepstral coefficients, wherein each of the plurality of transformations is a domain dependent transformation which is pre-trained on domain-specific data;

wherein the one or more computer processors implements a fifth computer software module stored in the one or more computer memories;

wherein the fifth computer software module is programmed by computer software to stack the plurality of acoustic reference vectors in the one or more computer memories to form a super acoustic reference vector which includes a plurality of domain dependent transformations of the first human speech signal;

wherein the one or more computer processors implements a sixth computer software module stored in the one or more computer memories;

wherein the sixth computer software module is programmed by computer software to implement a neural network to transform the super acoustic reference vector into a plurality of domain independent embeddings by extracting common information between the plurality of domain dependent transformations;

wherein the one or more computer processors implements a seventh computer software module stored in the one or more computer memories;

wherein the seventh computer software module is programmed by computer software to perform a multi-class speaker-recognition task on the plurality of domain independent embeddings by using a neural network having an input and an output layer with a number of output nodes equal to a number of speakers enrolled in a system;

wherein the multi-class speaker-recognition task processes the plurality of domain independent embeddings to provide a plurality of posterior probabilities, one for each speaker for a plurality of human speakers;

wherein the one or more computer processors implements an eighth computer software module stored in the one or more computer memories; and wherein the eighth computer software module is programmed by computer software to provide an indication of speaker identification corresponding to a highest posterior probability.

8. The apparatus of claim 1 wherein
each augmented speech signal of the plurality of sets of the plurality of augmented speech signals is a copy of the corresponding human speech signal of the plurality of human speech signals augmented using different room impulse responses and noises.

9. The method of claim 3 wherein
the step of augmenting the raw speech signal is effected by using different room impulse responses and noises, wherein the different room impulses and noises are different from an original domain identity to which the raw speech signal belongs.

10. The apparatus of claim 1 wherein
each acoustic reference vector of the plurality of sets of the plurality of acoustic reference vectors is an i-vector and is specifically trained on data from pre-defined acoustic conditions.

11. The apparatus of claim 10 wherein
the pre-defined acoustic conditions include a room acoustic condition.

12. The apparatus of claim 11 wherein
the pre-defined acoustic conditions include a small room acoustic condition and a big room acoustic condition.

13. The apparatus of claim 10 wherein
the pre-defined acoustic conditions include an outdoor acoustic condition.

14. The apparatus of claim 13 wherein
the outdoor acoustic condition includes a street noise acoustic condition.

15. The method of claim 3 wherein
the step of processing the raw speech signal includes classifying the raw speech signal as belonging to one of the plurality of pre-defined acoustic domains if the raw speech signal is determined to be within one of the plurality of pre-defined acoustic domains.

* * * * *